(12) United States Patent
Berghuijs et al.

(10) Patent No.: US 9,630,037 B2
(45) Date of Patent: Apr. 25, 2017

(54) FIRE PROTECTION SYSTEM FOR AIR CLEANING SYSTEM

(75) Inventors: Stefan Berghuijs, Alkmaar (NL); Jeroen Crezee, Heerhugowaard (NL); Cees Knijn, Broek Op Langedijk (NL)

(73) Assignee: PLYMOVENT GROUP B.V., Alkmaar (NL)

( * ) Notice: Subject to any disclaimer, the term of this patent is extended or adjusted under 35 U.S.C. 154(b) by 57 days.

(21) Appl. No.: 14/126,829

(22) PCT Filed: Jun. 14, 2012

(86) PCT No.: PCT/EP2012/061259
§ 371 (c)(1),
(2), (4) Date: Dec. 18, 2013

(87) PCT Pub. No.: WO2012/171985
PCT Pub. Date: Dec. 20, 2012

(65) Prior Publication Data
US 2014/0124224 A1    May 8, 2014

Related U.S. Application Data

(60) Provisional application No. 61/497,799, filed on Jun. 16, 2011.

(51) Int. Cl.
*B01D 50/00*    (2006.01)
*A62C 2/06*    (2006.01)
(Continued)

(52) U.S. Cl.
CPC ............... *A62C 3/14* (2013.01); *B01D 45/08* (2013.01); *B01D 45/16* (2013.01);
(Continued)

(58) Field of Classification Search
CPC ........ B01D 50/00; B01D 46/18; B01D 51/00; B01D 46/42; B23K 9/32; A62C 4/04
(Continued)

(56) References Cited

U.S. PATENT DOCUMENTS 1,499,437 A * 7/1924 Adams .................. F23J 15/022
110/119
3,009,539 A * 11/1961 Papp ........................ F01N 3/06
55/428
(Continued)

FOREIGN PATENT DOCUMENTS

CA        2346144 A1    4/2000
CN        2538379        3/2003
(Continued)

OTHER PUBLICATIONS

International Search Report, PCT/EP2012/061259, dated May 29, 2013, 7 pages.

*Primary Examiner* — Duane Smith
*Assistant Examiner* — Minh-Chau Pham
(74) *Attorney, Agent, or Firm* — Young & Thompson

(57) ABSTRACT

An air cleaning system (10) is disclosed comprising a fire protection system. The fire protection system comprises at least one of (i) a spark arrestor (21), (ii) a particle feeder (31), (iii) a fire detection system; and (iv) a fire extinguishing system. A preferred spark arrestor comprises a particle pre-separator (22). A preferred particle pre-separator has a core-and-vane assembly that prevents air traveling through the particle pre-separator from traveling in a straight line.

20 Claims, 6 Drawing Sheets

(51) Int. Cl.
  *B01D 46/00* (2006.01)
  *B23K 9/32* (2006.01)
  *B23K 37/00* (2006.01)
  *B01D 45/16* (2006.01)
  *B01D 45/08* (2006.01)

(52) U.S. Cl.
  CPC ....... *B01D 46/0093* (2013.01); *B01D 50/002* (2013.01); *B23K 9/325* (2013.01); *B23K 37/006* (2013.01)

(58) Field of Classification Search
  USPC ...... 55/293, 354, 317, 430, 320, 323, 385.1; 454/66; 110/119
  See application file for complete search history.

(56) References Cited

U.S. PATENT DOCUMENTS

| | | | |
|---|---|---|---|
| 3,407,575 A * | 10/1968 | Krizman | 55/448 |
| 4,358,300 A | 11/1982 | Schlapman et al. | |
| 4,726,940 A | 2/1988 | Kobayashi | |
| 5,145,496 A | 9/1992 | Mellen | |
| 5,417,729 A * | 5/1995 | Greenleaf, Sr. | 55/350.1 |
| 6,626,984 B1 | 9/2003 | Taylor | |
| 6,758,875 B2 | 7/2004 | Reid et al. | |
| 2003/0089087 A1* | 5/2003 | Reid et al. | 55/385.1 |
| 2004/0025481 A1 | 2/2004 | Bugli et al. | |
| 2006/0260286 A1 | 11/2006 | Schlebes et al. | |
| 2009/0050105 A1 | 2/2009 | Shibata et al. | |
| 2009/0113857 A1* | 5/2009 | Sithes | 55/293 |
| 2010/0115896 A1 | 5/2010 | Reid et al. | |
| 2010/0229727 A1 | 9/2010 | Barkdoll | |
| 2011/0277454 A1* | 11/2011 | Christianson | F01N 3/06 60/297 |
| 2012/0270489 A1* | 10/2012 | Sithes | 454/66 |
| 2014/0102300 A1* | 4/2014 | Ray, Jr. | B01D 45/16 95/272 |
| 2016/0023027 A1* | 1/2016 | McDaniel | A62C 4/04 110/119 |

FOREIGN PATENT DOCUMENTS

| | | |
|---|---|---|
| DE | 19834327 A1 | 2/2000 |
| EP | 1918056 A1 | 5/2008 |
| GB | 1345844 | 6/1972 |
| JP | 10-216443 A | 8/1998 |
| JP | 2010-201305 A | 9/2010 |
| WO | 2011/009166 A1 | 1/2011 |

* cited by examiner

FIRE PROTECTION SYSTEM FOR AIR CLEANING SYSTEM

BACKGROUND OF THE INVENTION

1. Field of the Invention

The invention relates generally to a fire protection system for use in an air cleaning system and more particularly to a multicomponent fire protection system.

2. Description of the Related Art

Air cleaning systems have the potential of presenting serious fire hazards. Fires occur when three necessary components are present: oxygen, fuel, and heat. Air cleaning systems generally comprise a blower that forces a flow of air through one or more filter elements. The air flow contains an ample supply of oxygen, which means that this component of a fire hazard is always present in any air cleaning system.

Fuel is often present as well. The filter element itself often comprises combustible materials, for example cellulose, synthetics or cotton filter cloth. The dust particles being removed from the air flow oftentimes are combustible, in particular in industrial settings. Examples include welding fumes, saw dust; cotton dust; flour; and the like. The small particle size of these materials further exacerbates the problem. In many situations the air flow contains flammable liquids or vapors. For example, oils are used in welding and machining of metal components, for lubrication and for conservation or anti-oxidation of the work pieces. Oil enters the air flow in the form of vapor and small droplets. Oil becomes entrapped in dust covering the filter element, and is also adsorbed by the fibers of the filter cloth material. In addition, an oil film may develop on internal surfaces in the ducts of the air cleaning system, in particular upstream of the filter element.

Thus, oxygen, the first component needed for a fire, is present in virtually every air cleaning system. Fuel, the second component, is present in many air cleaning systems. Heat is not supposed to be present, but could enter the system, often in the form of sparks.

The main sources of sparks entering an air cleaning system include sparks entering the air cleaning system from outside the system, as commonly occurs in air cleaning systems for welding and machining operations. These sparks are formed with dry metal fabrication processes, such as welding, grinding, laser and plasma cutting and the like.

Various spark arrestors have been proposed for use in air cleaning systems for removing welding fumes.

U.S. Pat. No. 4,358,300 to Schlapman et al. discloses a spark trap including an internal baffle for reducing the velocity of the air stream passing through the trap. Particles settle out of the air stream into water contained in a water chamber at the bottom of the device.

U.S. Pat. No. 5,145,496 to Mellen discloses a multi-baffled flame arrestor positioned at the air inlet opening of a filter housing.

U.S. Pat. No. 6,626,984 to Taylor discloses a cylindrical filter element mounted within a cylindrical collector barrel so as to define an annular flow space between the two. A vane assembly is mounted at the top of the collector barrel for directing the incoming flow of air along a generally cyclonic path through the flow space, so that sparks and heavy particulates are forced outwardly away from the surface of the filter element, thereby increasing filter life and reducing the chance of fire.

U.S. Pat. No. 6,758,875 to Reid et al. discloses a robotic welding station with spark arrestor. The spark arrestor contains a baffle removably disposed on a housing for removing particulates from an air chamber.

U.S. Patent Application Publication 2010/0229727 to Barkdoll discloses a system for reducing the occurrence of fires in a fabric filter dust collection system. The system comprises a spark arrestor having a plurality of spaced-apart, wedge-shaped members having a gap between adjacent members sufficient to interrupt the flow of combustible particles from the source to the dust collection system.

U.S. Patent Application Publication 2006/0260286 to Schlebes et al. discloses a device for removing sparks or other hot particles from a gaseous stream. The device comprises a bulk ceramic or mineral material. The entire gaseous stream is forcibly guided through the bulk material such that the gaseous stream is substantially free from sparks after exiting the bulk material.

With the exception of the Schlebes et al reference, the general approach appears to be to make use of inertia for separating sparks from the gas stream, either by impinging the gas stream onto one or more baffles, or by forcing the gas stream into a cyclone pattern. Although sound in principle, this approach inevitably permits passage of smaller sparks, which may still contain enough heat to cause fire in the air cleaning system. Also, the components of these spark arrestors are exposed to contaminants of the air stream, such as oil, which makes regular cleaning a necessity. The design of the prior art spark arrestors makes cleaning difficult or even impossible.

The spark removal device of Schlebel et al. is designed to trap all sparks as may be present in the gas stream. It is clear that the device is also efficient in trapping oil, making the spark arrestor a fire hazard in its own right.

Thus, there is a need for an improved spark arrestor that efficiently separates sparks from an incoming air stream, yet is easy to clean.

There is a further need for a device capable of dosing particulate material, such as lime, into an air cleaning system There is a further need for a fire protection system capable of preventing or dousing fires caused by incomplete spark removal.

BRIEF SUMMARY OF THE INVENTION

The present invention addresses these problems by providing a fire protection system for air cleaning systems that addresses one or more of (i) fire prevention; (ii) reduction of fuel combustibility; (iii) fire detection; and (iv) fire extinguishing or fire suppression. The fire protection system comprises at least the improved spark arrestor of the present invention.

Another aspect of the invention comprises the improved spark arrestor.

BRIEF DESCRIPTION OF THE DRAWINGS

The features and advantages of the invention will be appreciated upon reference to the following drawings, in which.

DETAILED DESCRIPTION OF THE INVENTION

Figure 1:
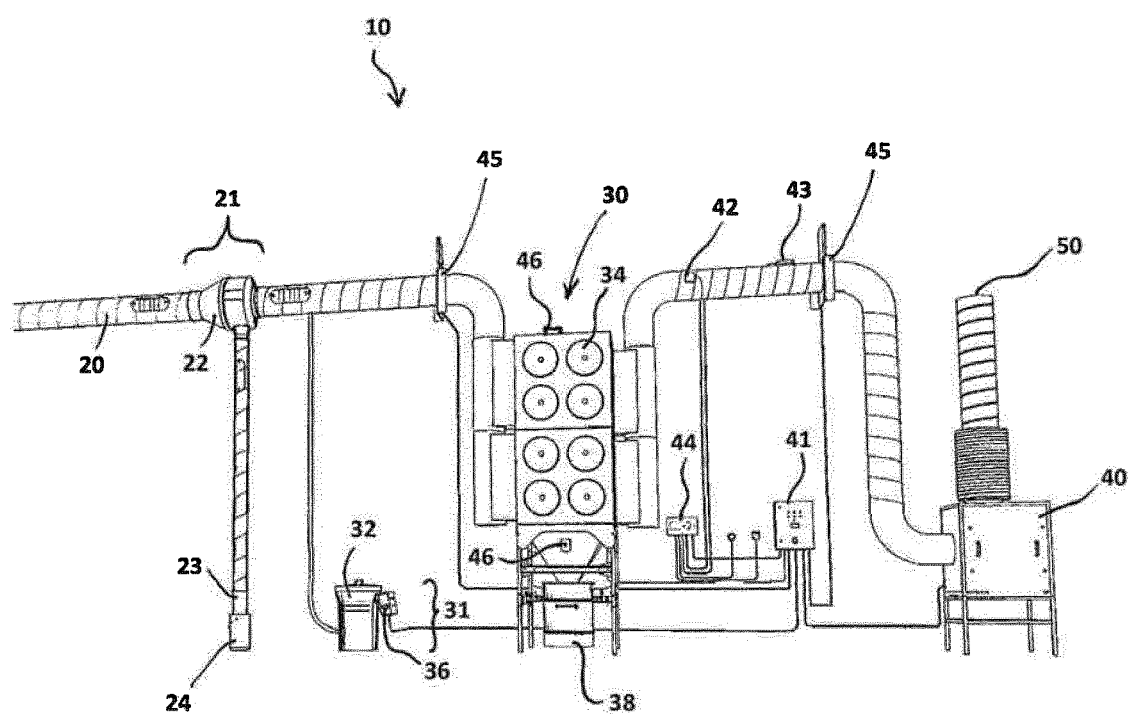
FIG. 1 is a representation of an embodiment of the invention, showing an air cleaning system with a fire protection system comprising several components.

The fire protection system of the present invention comprises one or more of the following components:
(i) a spark arrestor for preventing sparks from entering the air cleaning system;
(ii) a particle feeder for feeding particles into the air cleaning system. The particles are preferably of a material having fire retardant and/or fire extinguishing properties;
(iii) a fire detection system;
(iv) a system for extinguishing any fires inside the air cleaning system.

The function of the spark arrestor is to prevent sparks that are generated outside the air cleaning system from entering into the air cleaning system. For air cleaning systems that are used in environments where sparks are likely or certain to be created, it is desirable that the fire protection system includes a spark arrestor. Such environments include most dry metal fabrication work shops, where processes are performed such as welding (MIG, MAG, stick, robotic), grinding, manual and automated plasma and laser cutting, flame spraying, welding tables, welding robots, machine laths, and the like.

Spark arrestors known in the art suffer from a number of drawbacks. For example, spark arrestors of the type disclosed in U.S. Patent Application Publication 2006/0260286 to Schlebes et al present serious disadvantages. Although such spark arrestors are designed to create an entirely spark-free environment inside the air cleaning system, they do so at the expense of a significant pressure drop, which is undesirable in most air cleaning systems. Also, the spark arrestors of Schlebes et al. collect oil as may be present in the air stream, which causes a fire hazard inside the spark arrestor. Therefore, although spark arrestors of this type may be used in the fire protection system of the invention, they are not preferred. In general, preferred spark arrestors are those that rely on inertia and/or centrifugal forces for separating sparks from the air stream.

In addition, prior art spark arrestors generally are of unitary construction, making them difficult to clean. In particular the components responsible for imparting a rotating movement to the air flow, such as baffles and vanes, tend to collect dust and debris, which may provide fuel to unwanted fires.

These disadvantages are mitigated or avoided in the spark arrestors of the present invention, more fully described hereinbelow.

The air flow through the spark arrestor should be high enough to cause meaningful separation of solid particles as a result of the centrifugal forces created inside the spark arrestor. On the other hand, the air flow should not be so high as to cause an unacceptably great pressure drop inside the spark arrestor. Typically, the volumetric air flow of an air cleaning system is governed by design parameters dictated by air cleaning needs. Many air cleaning systems offer the flexibility of operating within a specific volumetric air flow range. The spark arrestor can be dimensioned to handle the required volumetric air flow range while making sure it has adequate particle separation performance (even at the low end of the range), while staying within acceptable limits in terms of pressure drop (even at the high end of the range).

A second component of a fire protection system of the present invention can be a particle feeder for feeding a particulate material into the air stream. The particulate material is non-combustible. It can be an inert material, such as lime, sand, clay, or silica. Alternatively the particulate material may have flame retardant and/or fire extinguishing properties.

Inert material, such as lime, silica, clay, or sand, act by coating a combustible material, such as an oil film, with a dusting of particles, thereby shielding the combustible material from coming into contact with any sparks. Particulate materials of any type aid in the removal of combustible material from the air cleaning system by combining with the combustible material and preventing it from sticking to components of the air cleaning system. The particles are screened out by the filter element present in the air cleaning system, and are removed for example by regular cleaning of the filter element with pulses of counter-current compressed air. The particle diameter of the particulate material is preferably in the ranger of from 1 µm to 1000 µm, more preferably from 1 µm to 10 µm. The amount of particulate material is a function of the size of the system, and the amount of oil entering the system. Typically an amount of from 1 to 3 grams of particulate material per hour and per square meter of filter surface is sufficient. The particles can be fed into the air stream using any suitable particle feeder known in the art, for example any one of the particle feeders disclosed in U.S. Pat. No. 4,726,940 to Kobayashi, the disclosures of which are incorporated herein by reference. In a preferred embodiment the particle feeder has the improved design discussed hereinbelow in connection with FIG. 6.

The air cleaning system may further comprise a fire detection system. The fire detection system can comprise one or more heat sensors; and/or one or more spark detectors; and/or one or more smoke detectors. Heat sensors may operate on the principle that a gas contained in the sensor becomes more conductive when its temperature increases. Other types of temperature sensors include bimetallic switches and thermistors, in particular negative temperature coefficient (NTC) thermistors. Importantly, heat sensors used in the system should have a clear enough trigger point to allow activation of a fire alarm and/or fire extinguishing components.

Heat sensors can be placed upstream or downstream of the filter element, or both upstream and downstream of the filter element. It is desirable to place at least one heat sensor at a high point in the filter compartment. It is desirable also to place a heat sensor above the dust collection bin placed under the filter compartment.

Spark detectors respond to infrared radiation emitted by sparks or flames. These detectors can also be placed upstream or downstream of the filter element, or both. It will be understood that it is not useful to place a spark detector upstream of the filter element in a filter system that is exposed to sparks and that is not equipped with a spark arrestor.

Smoke detectors respond to the presence of particles in the air stream, and should therefor be placed downstream of the filter element only.

If one or more of the detectors detect conditions that could be associated with a fire (an increase in temperature above a certain threshold value; the presence of infrared radiation inside the air cleaning system; and or the presence of particles downstream of the filter element), a signal is sent to a system control processor, which responds by setting of an audible alarm, or flashing lights, or the like. It will be understood that a malfunction of the filter element could cause dust particles to reach the smoke alarm, thereby setting it off. Under these circumstances no temperature increase and no infrared radiation will be detected. The system control processor can be programmed to recognize this condition as a filter malfunction, as distinguished from a fire. However, it may be preferred to program the system to give off a fire alarm even under such conditions of probable malfunction, so as to be sure to provide a proper response under any condition that could signify the presence of a fire.

A fourth component of the fire protection system can be a system for extinguishing any fires detected inside the air cleaning system. Extinguishing a fire generally involves cutting off the supply of oxygen to and/or removing heat from the fire. For example, the air cleaning system can include shut-off valves that are activated by a system control unit upon detection of a fire. The shut-off valves isolate the fire in a sealed portion of the system. Because no fresh oxygen is allowed to enter this sealed portion, the fire is starved of oxygen and is extinguished. The control unit may also turn off the blower fan, as no air is allowed to pass through the system when the shut-off valves are closed.

The system may further contain automated fire extinguishers, which are activated by the system control unit in response to a fire alarm. Examples of suitable fire extinguishers are water sprinklers, aerosol extinguishers, carbon dioxide extinguishers, and foam extinguishers. The selection of the most appropriate type of extinguisher is made in function of the type of combustible material likely to be present in the air cleaning system (extracted fumes; oil; flour; plastic dust; saw dust; etc.) and the materials used in construction of the air cleaning system (e.g., whether metal or plastic ducts are used in the system; whether or not the filter element is made of a combustible material; and the like). In many cases, potassium based aerosol extinguishers are preferred.

Oil by itself does not necessarily create a major fire hazard. The welding process itself causes the deposition of sparks onto oil-covered work pieces, without causing a fire. However, oil films covering the components of an air cleaning system create serious fire hazards, in part because such film become mixed with dust particles. These oil-dust mixtures are believed to be highly combustible. In addition, the air flow inside an air cleaning system further increases the fire hazard.

The fire protection system can include one, two, three or four components. For example, an air cleaning system used in an environment that does not produce sparks may not need a spark arrestor component in the fire protection system. An air cleaning system that is not exposed to significant amounts of combustible materials may not need a particulate feeder system, etc. By like token, air cleaning systems operating under conditions presenting significant fire hazards may contain three or all four components in its fire protection system. Examples of such air cleaning systems include those used for removing welding fumes, in particular in automotive plants where metal auto parts are customarily coated with stamping oil. Fire protection systems comprising at least a spark arrestor are preferred.

An exemplary (and preferred) fire response sequence is as follows. In response to a signal from one or more of the detectors in the system, a controller shuts the valves of the air cleaning system, and stops the exhaust fan. If the system comprises a compressed air tank (as may be used, for example, for cleaning the filter element), the controller opens a valve allowing compressed air to escape to the atmosphere, thereby eliminating this potential source of oxygen Immediately after these containment measures the controller activates the fire extinguishing components in the system.

Description of Illustrative Embodiments

The following is a description of certain embodiments of the invention, given by way of example only and with reference to the drawings. Referring to FIG. 1, a fire protection system is shown having four fire protection components.

Air cleaning system 10 comprises an air inlet 20, a filter system 30, and a fan 40. During operation of air cleaning system 10, fan 40 draws air in at air inlet 20, forces the air through filter system 30, and expels clean air at outlet 50. Treated air exiting outlet 50 may be vented to the outdoors, or may be recycled into the building where the air fouling operation takes place.

Located immediately downstream of air inlet 20 is spark arrestor 21, which comprises a preseparator 22, optionally a valve unit 23, and a dust collector 24. In preseparator 22, sparks and other large particles are separated from the air stream entering air cleaning system 10. Sparks and other large particles separated from the air stream fall by gravity into dust collector 24. When dust collector 24 needs to be emptied or replaced, valve unit 23 is closed so that air cleaning system 10 can continue to operate while dust collector 24 is temporarily disconnected.

Downstream from spark arrestor 21 is located particle feeder 31, which comprises a feeder hopper 32. Feeder hopper 32 is provided with a level control (not shown) and a vibrating magnet (not shown). Instead of a vibrating magnet, a knocking magnet may be used. Operation of particle feeder 31 is controlled at control box 36. Pulses of compressed air are injected into the hopper via a valve, connected to the compressed air system. These pulses of compressed air inject particulate material into air cleaning system 10.

Certain particulate materials, such as lime, are hygroscopic and become "sticky" during storage. It has been found that sticky materials are not reliably injected into the air cleaning system by pulses of compressed air. The compressed air pulsing system can be replaced with a screw feeder, as desired.

Filter system 30 collects dust particles on filter elements 34 entrained with the air stream. Filer elements 34 are regularly cleaned by a counter-current pulse of pressurized air (not shown). Dust released from filter element 34 is collected in dust collector 38.

Located in the area around filter system 30 are various fire detection sensors, which form an integrated fire detection system coordinated by fire detection control panel 44.

Upstream of filter system 30 are two heat sensors 46, with a data connection to fire detection control panel 44. Downstream from filter system 30 are two spark detectors 42, and a smoke detector 43. Located near filter system 30 and above dust collector 38 are aerosol fire extinguishers (not shown), which are connected to fire detection control panel 44.

If a fire is detected, fire detection control panel 44 triggers a timer, which is set to allow the filter system controller to take containment measures. Fire detection control panel 44 then sends a signal to system control unit 41, which responds by closing pneumatic sliding valves 45 and switching off exhaust fan 40. Particle feeder 31 is switched off by a pressure sensitive switch in response to the loss of under pressure in the air cleaning system as a result of inactivation of exhaust fan 40.

The above-described containment measures are completed within 5 seconds, the time delay programmed into the timer of fire detection control panel 44. After this timed delay, fire detection control panel 44 activates fire extinguishers (not shown).

Figure 2:
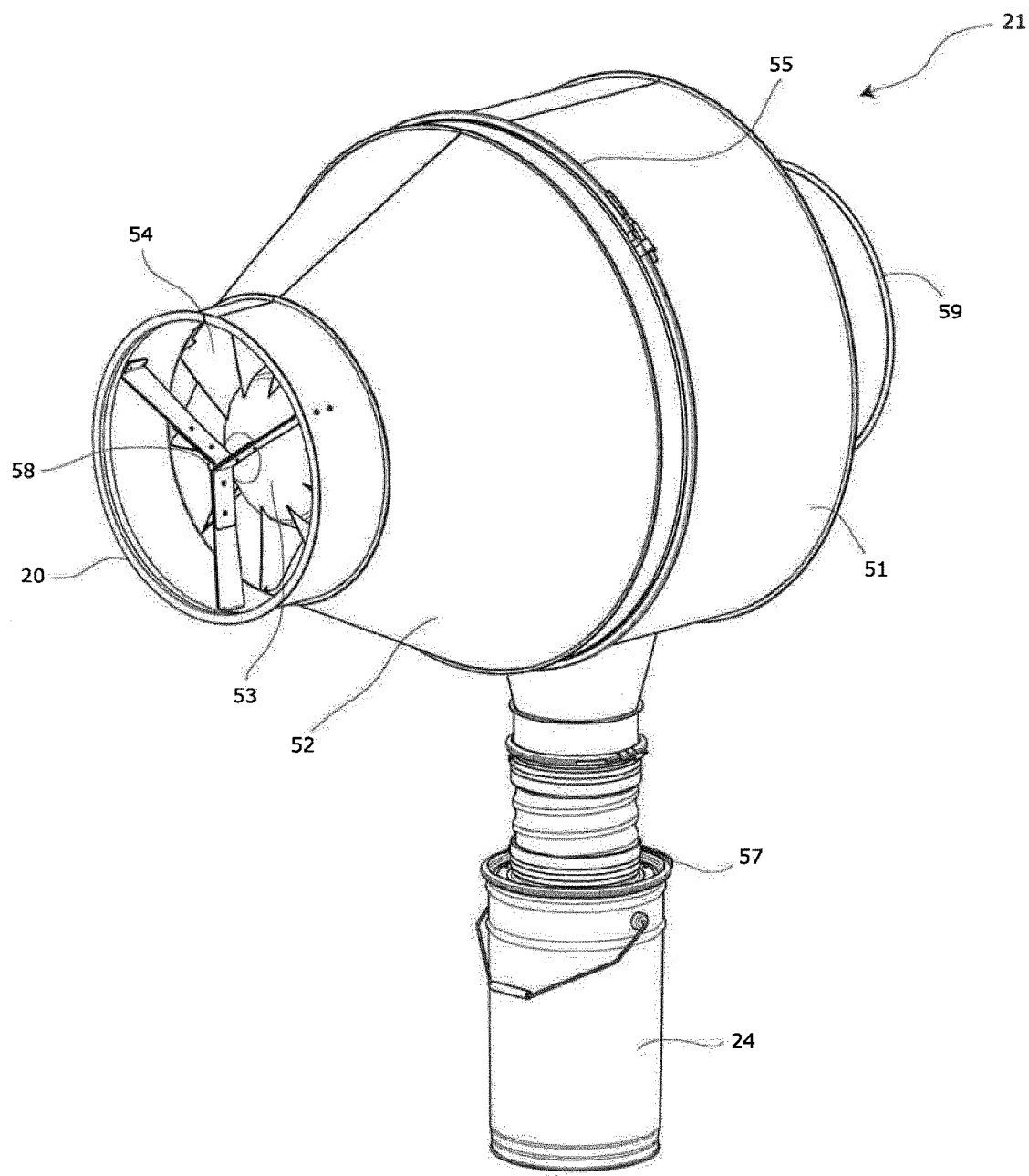
FIG. 2 shows a perspective view of a spark arrestor for use in the fire protection system of the invention.

FIG. 2 shows a perspective view of spark arrestor 21. Spark arrestor 21 comprises a cylindrical air inlet 20, a conical housing portion 52, and a cylindrical housing portion 51. Conical housing portion 52 is releasably connected to cylindrical housing portion 51 by means of band clamp 55.

Located inside air inlet 20 is bracket 58 which supports core 53. Mounted on core 53 are vanes 54. Core 53 and vanes 54 are shaped and dimension so that particles entering spark arrestor 21 at inlet 20 never have a straight line of flight to outlet 59.

By virtue of band clamp 55, the front portion of the housing of spark arrestor 21 (comprising air inlet 20 and conical portion 52) can be disconnected from cylindrical housing portion 51, and be removed. For removal of the cone a bolt at 58 can be loosened as well. Such removal exposes core 53 and vanes 54, for easy cleaning and maintenance. It will be understood that instead of band clamp 55 any other type of quick release connection can be used.

Dust collector 24 is releasably connected to spark arrestor 21 by means of band clamp 57. When dust collector 24 needs to be emptied or replaced, it can be readily disconnected by releasing band clamp 57. It will be understood that instead of band clamp 57 any other type of quick release connection can be used.

Figure 3:
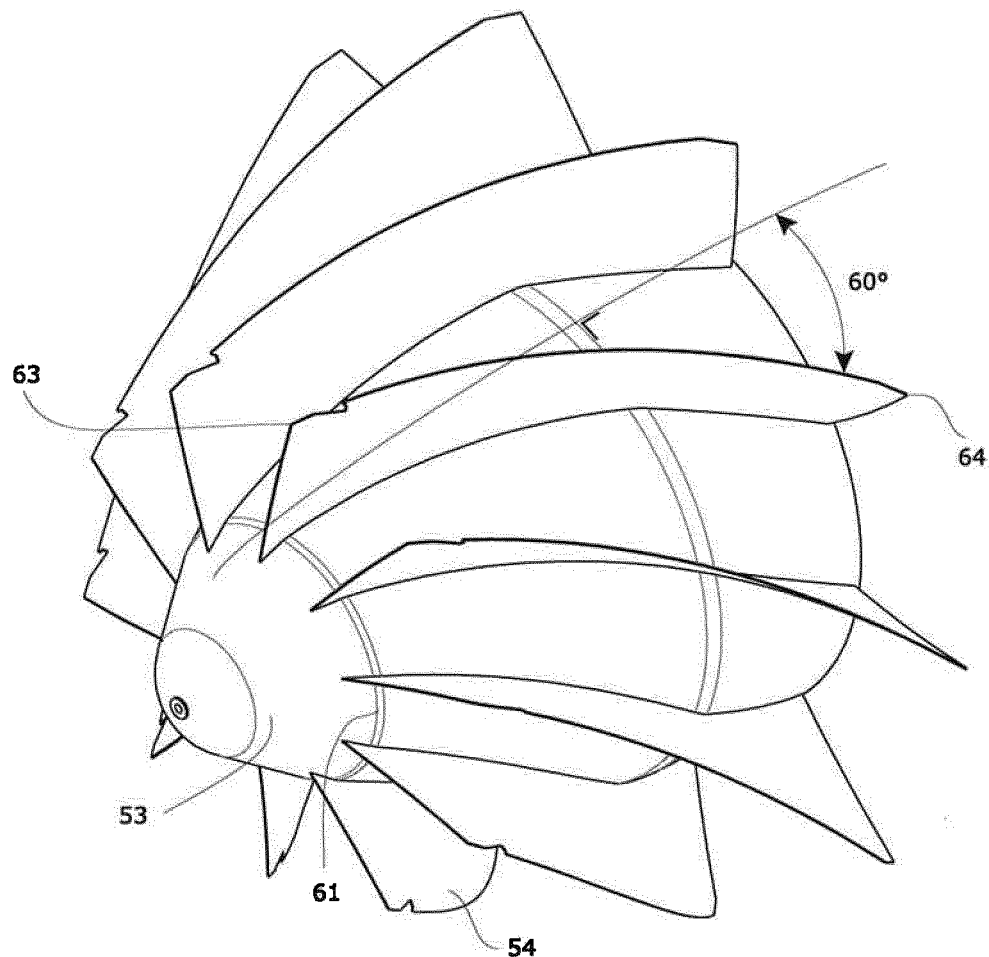
FIG. 3 shows a perspective view of the core-and-vane portion of the spark arrestor of FIG. 2.
Figure 4:
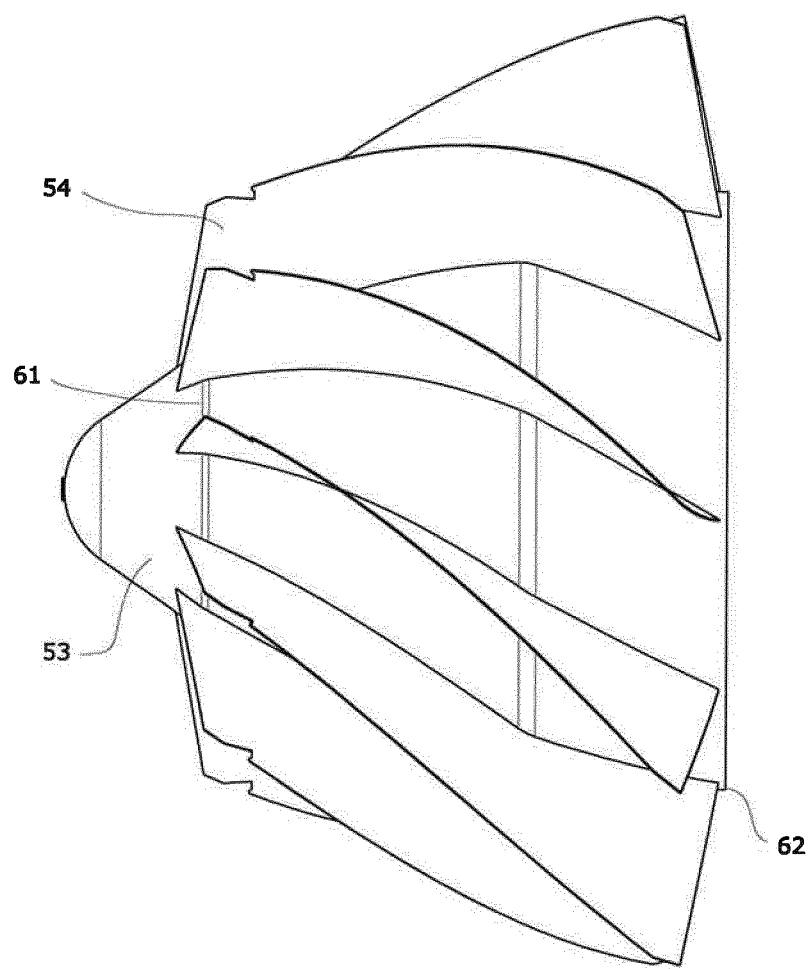
FIG. 4 shows a side view of the core-and-vane portion of the spark arrestor of FIG. 2.

FIG. 3 shows a perspective frontal view of core 53; FIG. 4 shows a perspective side view. As can be seen in FIG. 4, core 53 has a stepped conical shape. The front portion of the core flares out at an angle of 25° In general, an angle in the range of from 17° to 30° is suitable. The leading edge of each vane 54 is connected to core 53 at circle 61. The trailing edge of each vane 54 is attached to core 53 at circle 62.

As shown in FIG. 3, each vane 54 describes an arc of 60° along the surface of cone 54, going from the leading edge 61 of the vane to the trailing edge 64. This feature helps ensure that a particle entering the spark arrestor 21 through inlet 20 cannot travel to outlet 59 in a straight line. As a result, spark arrestor 21 effectively separates larger particles from the air stream, without creating excessive back pressure.

Figure 5:
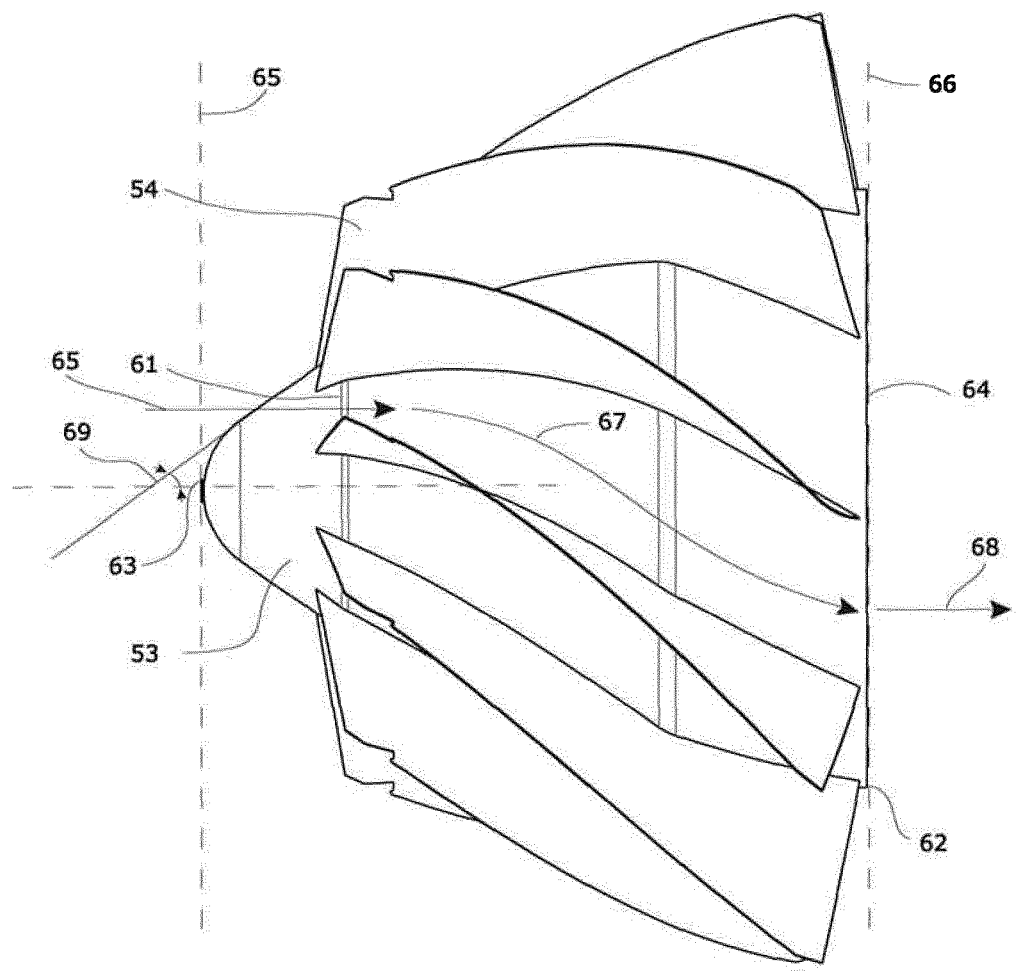
FIG. 5 diagrammatically shows the air flow through the core-and-vane portion of the spark arrestor.

FIG. 5 repeats the perspective side view of the core-and-vanes portion of the spark arrestor shown in FIG. 4. Core 53 has a first end 63 facing the gas inlet opening 20 of spark arrestor 21 (see FIG. 1). Second end 64 of core 53 is opposite first end 63. Air enters the spark arrestor through imaginary plane 65, and leaves the spark arrestor through imaginary plane 66. An air particle entering the spark arrestor at arrow 65 is forced by vanes 54 to travel in a curved line 67, to leave the spark arrestor at arrow 68. In addition, the surface of core 53 forms an angle 69 of 25° with its central axis. The vanes 54 and the flare of the core effectively separate any solid particles of a meaningful size from the air flowing through the spark arrestor. Importantly, sparks, which are glowing solid particles, are also separated from the air flow.

Figure 6:
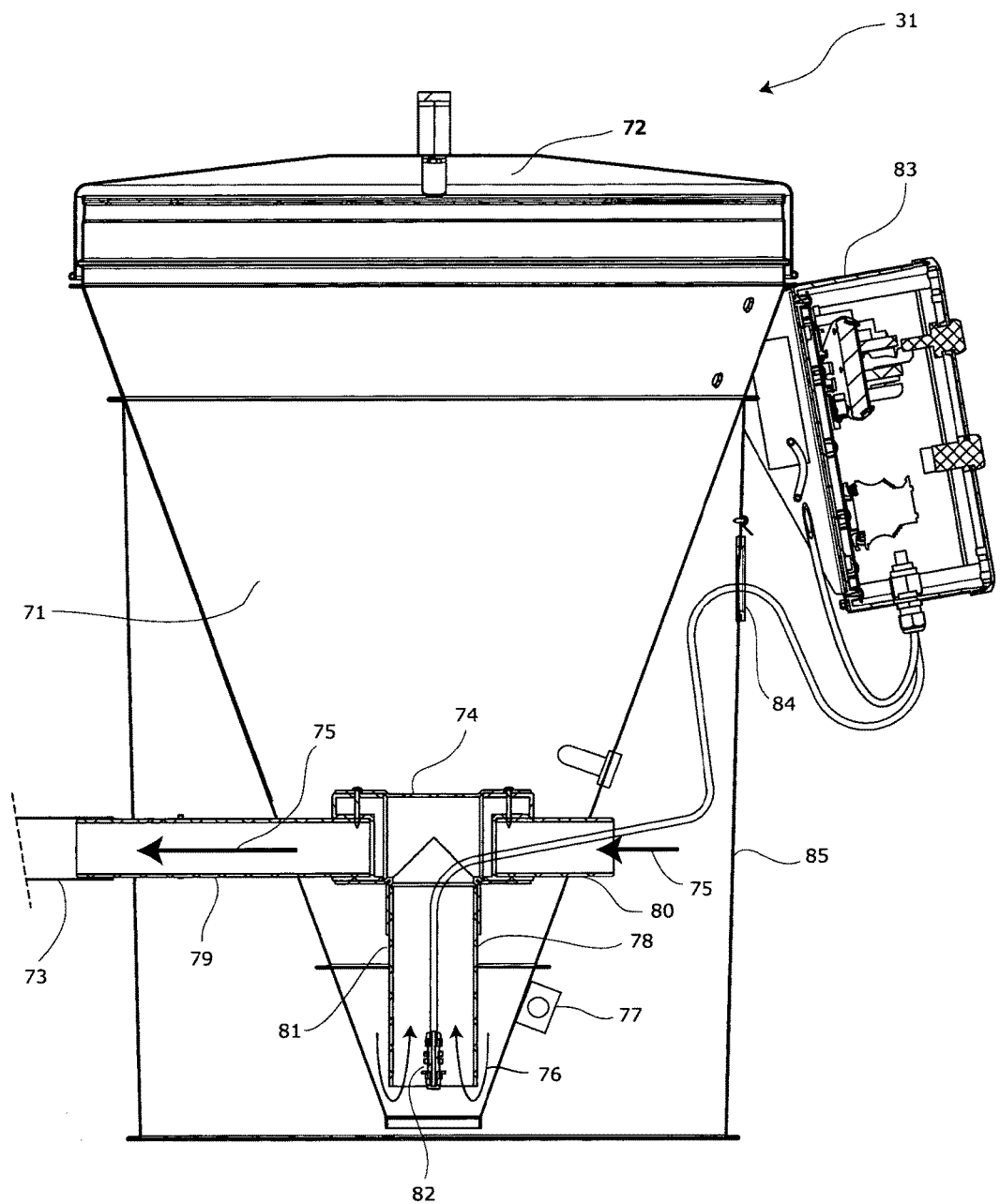
FIG. 6 shows an embodiment of a particulate feeder for use in the fire protection system of FIG. 1.

FIG. 6 shows a preferred particle feeder for use in the fire protection system of the present invention.

Particle feeder 31 comprises a hopper 71, covered with a lid 72. Hopper 71 contains particulate material, which enters stand pipe 78 at the bottom of hopper 71, as shown by arrows 76. A first tube 79 extends through the side wall of hopper 71. First tube 79 is connected to an air cleaning system (not shown) via flexible hose 73. Inside hopper 71, first tube 79 is connected to T-piece 74, which is open at 81. At the opposite end of first tube 79, a second tube 80 connects T-piece 74 to the outside air, through openings 84 in housing 85.

A fan in the air cleaning system (not shown) produces negative pressure inside the air cleaning system. As a result, air is drawn into second tube 80, through openings 84 in housing 85, and an air flow is created through second tube 80, T-piece 74, first tube 79 and hose 73, as shown by arrows 75.

At predetermined intervals pulses of compressed air are injected into stand pipe 78 through nozzle 82. The air pressure is at least 3 bar. Each pulse of compressed air entrains an amount of particulate material into T-piece 74, where it is taken up by air flow 75 and injected into the air cleaning system via flexible hose 73. The amount of particulate material introduced into the air cleaning system is governed by the frequency of the compressed air pulses, and the duration of individual pulses. The effectiveness of the compressed air flow can be amplified by placing a venturi restriction in the particle feed line.

The particles may be transported pneumatically by placing an auxiliary fan in the particle feed line. As an alternative, to avoid contact of the mechanism of the fan with the particulate material, the fan may be placed in a shunt line to the particle feed line, so that particulate material is drawn into the particle feed line by the venturi effect. In embodiments using an auxiliary fan the speed of the auxiliary fan can be made adjustable in function of the amount of particulate material to be transported.

Alternatively the operation of the exhaust fan can be used for transportation of the particulate material into the air cleaning system. In one embodiment a branch line connects from a point in the air cleaning system downstream from the exhaust fan to an upstream point of the particle feeding line, so that particulate material is blown into the air cleaning system by the overpressure caused by the exhaust fan. In another embodiment a branch line connects from a point in the air cleaning system upstream of the the filter (where there is under-pressure) to a point near the outlet of the particle feeding line, so that particulate material is sucked into the air cleaning system. In both embodiments the effectiveness of the air flow can be increased by placing a venturi restriction in the particle feed line.

In a particular embodiment the line contains an adjustable venturi restriction. Adjustments of the venturi can be automated, for example to counteract fluctuations in the airflow inside the air cleaning system.

Instead of a pneumatic feed, the particulate material can be fed into the air cleaning system by other means, such as gravity feed; or by mechanical propulsion means, such as a dosing auger; a vibrating conduit; a paddle wheel; and the like.

Hopper 71 is provided with vibrating magnet 77, to insure an uninterrupted flow of particulate material into stand pipe 78. Control panel 83 allows adjustment of the frequency and duration of compressed air puffs, and other functions of the particulate feeder.

Preferably the particle feeder comprises at least one of (i) means for monitoring the presence of a supply of particles; (ii) means for monitoring the operation of the particle feeder; and (iii) means for preventing disruption of the feeding of particles into the air cleaning system.

In general it is important to monitor the operation of the particle feeder, to ensure that particles are being fed into the air cleaning system, and that no clogging occurs in the particle feeder itself, or in the air cleaning system.

The main causes of particulate feeder malfunction are (i) lack of particulate material in the feeder hopper; (ii) bridging of particulate material in the feeder hopper; and (iii) clogging of the particulate feeder line.

The presence of particulate material in the hopper can be monitored with a level sensor. Many types of level sensors for particulate materials are known in the art. In an embodiment a level sensor is placed in the hopper at a level corresponding with a supply of particulate material for a predetermined number of hours, for example 24 hours. When the level drops below that of the level sensor, the system creates a warning signal, for example a (yellow) warning light. If the hopper is not refilled within the predetermined time the system will provide a malfunction signal, for example a red warning light and/or an audible signal.

Instead of use of a level sensor, the hopper may be placed on scales to confirm the presence of particulate material in the hopper. This method also provides a reliable reading of the amount of particulate material present in the hopper, which may be preferred to the binary information received from a level sensor. The signal from the scales may be used to monitor the dosing of particulate material over time, and can provide a warning system for malfunction of the dosing system, for example as a result of bridging in the hopper, or clogging of the feeder line.

Bridging of particulate material can be prevented by agitating the particulate material in the hopper. The use of a magnetic vibrator has already been mentioned. Other types of vibrators can be used as well. Instead of vibrators other mechanical agitators can be used, such as paddle screws, knocking devices, rotating arms, and the like. Rotating arms can be provides with scrapers, for example rubber flaps, that scrape particulate material from the hopper wall.

For refill of the hopper it may be desirable to temporarily stop the operation of mechanical devices, such as agitators and feeding screws. This can be accomplished, for example, by providing the hopper with a lid. Presence of the lid is monitored, for example, by a contact switch. When the lid is removed or opened the contact switch is interrupted, which sends a signal to a controller. The controller acts to stop the operation of the agitator and/or the feeder screw.

Replacement of the lid causes a re-start of the agitator and/or feeder screw. If the operator forgets to replace the lid, or closes the lid improperly so that the contact switch is not activated, the system creates a warning signal after a predetermined amount of time, for example 1 hour, has passed after the contact switch was first deactivated.

It is desirable to suck air from the overhead space in the hopper when the lid is open, to minimize dusting during the refill operation. This can be accomplished by providing a branch line to the air cleaning system. The contact switch of the lid causes a valve in the branch line to be opened when the lid is removed or opened. The valve is closed when the lid is replaced.

Incidents of clogging of the feeder line can be minimized by interrupting the feeding of particulate material into the air cleaning system when there is no or insufficient airflow in the air cleaning system. This can be accomplished, for example, by placing a flow sensor or a pressure sensor in the air cleaning system, at a point near the outlet of the particulate feeding line. If the flow sensor indicates no or insufficient air flow, or the pressure sensor indicates no or insufficient under-pressure, the system for feeding particulate material into the air cleaning system is stopped. Likewise, dosing of particulate material can be stopped upon receipt of a signal indicating that the exhaust fan of the air cleaning system is not operating. Conversely, dosing of particulate material can be conditioned on a confirmatory signal indicating that the exhaust fan is in fact operating.

Accumulation of particulate material in the feeder line can be prevented by periodically pulsing compressed air into the feeding line, or simply by providing a service door for moving a brush through the feeding line.

The occurrence of clogging can be detected, for example, by placing a first pressure sensor in the particle feed line, preferably near its inlet point; and a second pressure sensor in the air cleaning system, near the outlet of the particulate feeding line. If the second pressure sensor detects an under-pressure and the first pressure sensor does not there is clogging somewhere in the feeding line.

Alternatively a particulate sensor, for example an optical sensor, can be placed in the air cleaning system just downstream of the outlet of the feeding line. Such a sensor detects malfunction of the dosing system of any kind, including clogging.

Operation of the particulate feeder system can be tailored to specific parameters of the air cleaning system. For example, the amount of particulate material dosed into the air cleaning system over time can be tailored to the surface area of the filter in the air cleaning system. Alternatively, or additionally, it can be tailored to the amount of combustible material, such as oil as may be used as a machining aid, or for corrosion protection of metal parts that is taken up by the air cleaning system. The number of welding stations connected to the air cleaning system at a given point in time can be used as a proxy for the amount of combustible material in the air being exhausted by the system. Alternatively the air flow in the system can be used as a proxy for the number of welding stations in use, which in turn provides a proxy for the amount of combustible material in the air being exhausted. In another embodiment the color of the particulate material present on the filter is monitored to provide a measure of the amount of oil present in the particulate material present on the filter.

The amount of particulate material being dosed into the system can be temporarily increased or decreased in response to specific circumstances. For example, particulate material can be used as a pre-coat on the filter. After replacement of the filter a high dose of particulate material is used to quickly cover the filter. In some embodiments particulate material is dosed only immediately after replacement or cleaning of the filter.

Instead of operating continuously, the particulate feeder can be operated for a predetermined time at predetermined time intervals, for example during a half minute every 15 minutes, etc. The time interval can be measured as clock time or, preferably, as operating time of the air cleaning system.

Fouling of the spark arrestor may decrease its effectiveness, and increase the overall fire hazard of the air cleaning system. For example, build-up of a layer of oil and/or dust on the vanes of the spark arrestor and other parts exposed to contact with sparks, could create a fire hazard. Several measures can be taken to (i) minimize contaminant build-up; (ii) monitor the overall functioning of the spark arrestor; (iii) monitor contaminant build-up on specific surfaces of the spark arrestor; and (iv) facilitate cleaning.

Build-up of contaminants can be reduced or prevented by spraying water onto exposed spark arrestor surfaces, so that any contaminant deposited on such a surface is washed off. The effectiveness of the water film can be increased by mixing the water with a detergent, in particular a detergent having so-called grease-cutting action. If desired the water can be collected and reused. Build-up of contaminants in the water can be avoided by subjecting the water to a cleaning step prior to re-use. Such cleaning step can comprise filtering (for removal of solid contaminants) and skimming or centrifuging (for removal of liquid contaminants, such as oil).

Build-up of contaminants can also be reduced or prevented by providing exposed surfaces of the spark arrestor with a dirt repellent or non-stick coating. Dirt repellent coatings are known from nano-technology, and have found application on sound barriers along freeways, automobile windshields, building exterior surfaces, and the like. Non-stick coatings are used in certain chemical reactors, and in pots and pans. Examples include polytetrafluoroethylene (available under the trade name Teflon®), ceramics, enamel, and the like. It will be understood that, even if such coatings do not fully prevent the build-up of contaminants, their presence significantly facilitates the cleaning process.

The overall functioning of the spark arrestor can be monitored by means of a spark sensor placed immediately downstream from the spark arrestor. This spark sensor can be connected to appropriate circuitry to trigger an optical signal, such as a warning light, or an audible alarm. If desired, the spark sensor can be wired so as to cause the controller to switch of the exhaust fan of the air cleaning system.

Gradual build-up of fouling on exposed surfaces of the spark arrestor can be monitored in a variety of ways. For example, the spark arrestor can be provided with one or more inspection windows to allow visual inspection of an exposed surface. A light source can be mounted inside the spark arrestor to aid visual inspection.

Other monitoring means rely on changes in the surface properties of the exposed surfaces for monitoring of contaminant build-up. For example, one or more small light sources, such as LEDs, can be embedded in an exposed surface of the spark arrestor. One or more light sensors placed inside the spark arrestor receive light emitted by the LEDs. As fouling builds up on the exposed surfaces, including onto the LEDs, the amount of light received by the sensor(s) decreases. The degree of contamination can be shown on a control panel, for example as a percentage of fouling. When a pre-determined threshold value is reached, the control panel shows "100% contamination" and indicates that cleaning is necessary.

Another method for monitoring fouling relies on a dip stick placed in an area of the spark arrestor receiving representative amounts of contaminants. From time to time the operator of the air cleaning system removes the dip stick to visually inspect its level of contamination. The dip stick can be given a color, preferably white, to aid the visual inspection. As fouling builds up on the dip stick its apparent color changes from white to yellow to brown to dark brown. A reference color chart can be provided to aid in identifying the color hue associated with a need to clean the spark arrestor.

The color change of a white surface can also be used for an automated monitoring system. A patch of white material is attached to an exposed surface of the spark arrestor. A light bundle is aimed at the white patch, and reflected light is analyzed for light intensity and color. As fouling builds up, the reflected light decreases in intensity and the color shifts from white to yellow to brown.

In yet another embodiment, the conductivity of the fouling layer is monitored by two electrodes placed in close proximity of each other on an exposed surface of the spark arrestor. When the surface is clean, the conductivity measured by the electrodes is that of air, which is virtually equal to zero. As fouling builds up, the conductivity increases to measurable values.

In yet another embodiment an exposed surface of the spark arrestor is provided with a vibrating fork level switch, or a piezo switch. Damping or frequency drift of the vibration resulting from surface fouling is monitored by dedicated circuitry to provide early warning of excessive fouling.

In yet another embodiment the appearance of an exposed surface is monitored by a video camera or a charge couple device (CCD). Fouling can be detected by changes in reflectivity, color, etc. of the exposed surface.

In yet another embodiment the number of hours of operation is measured as a proxy for fouling. A timer connected to the controller of the exhaust fan monitors the time of operation of the fan. When the number of hours of operation reaches a predetermined value the controller activates a warning light, which serves as an indication that cleaning is due. After cleaning the timer is reset to zero. It can be desirable to provide the spark arrestor with an RFID chip, which aids in monitoring the elapsed time since the last cleaning operation, and helps ensure a zero reset at each cleaning operation.

The cleaning operation itself can be facilitated by providing the exposed surfaces with a non-stick coating, as described above. The spark arrestor can be provided with hinged or rotatable service hatches to provide easy access to the exposed surfaces. The core can be made rotatable, so that all vanes can be accessed from one single service hatch. The spark arrestor can be made of individual components that are connected to each other by quick-connect mechanisms known in the art. Specifically, the core may be connected to the spark arrestor housing by quick release couplings instead of bolts or nuts. Desirably the spark arrestor is comprised of two or more components in the longitudinal direction of the air flow. The individual components may be connected to each other by means of quick release couplings; or by means of screw threads or bayonet couplings; or by means of hinges in combination with latches for locking the components in place. Specifically, the back wall of the spark arrestor can be made removable for easy cleaning. Heavy spark arrestors can be provided with lifting lugs, so they can be easily supported when disconnected from the air conduits.

It may be desirable to provide the dust collector with a level detector, to provide a warning signal when it needs to be emptied or replaced. Any level detector suitable for solids may be used. Examples include vibrating level switches; ultrasound level switches; capacitative level switches; microwave and radar level sensors; gamma ray level sensors; and the like. The dust collector can be reusable, for example a drum; or it can be disposable, for example a bag. The outlet of the spark arrestor can be provided with a rotary lock, to prevent spillage during changeover.

Thus, the invention has been described by reference to certain embodiments discussed above. It will be recognized that these embodiments are susceptible to various modifications and alternative forms well known to those of skill in the art. For example, the spark arrestor may be modified by using baffles instead of vanes. A simpler particulate feeder can be used, for example as described in the Kobayashi reference.

Many modifications in addition to those described above may be made to the structures and techniques described herein without departing from the spirit and scope of the invention. Accordingly, although specific embodiments have been described, these are examples only and are not limiting upon the scope of the invention.

What is claimed is:
1. An air cleaning system, comprising:
a fire protection system that comprises a spark arrestor for preventing sparks from entering the air cleaning system beyond the spark arrestor, said spark arrestor comprising a particle pre-separator located to remove particles from a flow of a gas mixture, said particle pre-separator comprising:
   a. a housing comprising a gas inlet opening and a gas outlet opening;
   b. a core having a first end facing the gas inlet opening and a second end opposite to the first end, wherein the core is of a substantially conical shape, having a gradually increasing diameter in the direction from the first end to the second end; and
   c. a plurality of vanes attached to the core along helical line segments,
wherein the housing has a first conical housing portion enclosing the core, and a second cylindrical housing portion between the first housing portion and the outlet opening, said first housing portion having a substantially conical shape with a gradually increasing diameter in the direction from the gas inlet opening to the second housing portion, said second housing portion being provided with an opening, different from said gas outlet opening, for removal of pre-separated particles, and
wherein the core, the housing and each pair of neighboring vanes define a path for passage of the gas mixture such that no particulate entrained by the gas is permitted to travel in a straight line from a plane through the first end of the core to a plane through the second end of the core.

2. The air cleaning system of claim 1, wherein the fire protection system further comprises one component selected from the group consisting of:
   (i) a particle feeder for feeding particles into the air cleaning system;
   (ii) a fire detection system; and
   (iii) a fire extinguishing system for extinguishing any fires inside the air cleaning system.

3. The air cleaning system of claim 1, wherein the spark arrestor comprises at least one of:
   (i) means for minimizing contaminant build-up;
   (ii) means for monitoring the overall operation of the spark arrestor;
   (iii) means for monitoring contaminant build-up; and
   (iv) means for facilitating cleaning.

4. The air cleaning system of claim 2, wherein the fire protection system further comprises at least the particle feeder for feeding particles into the air cleaning system.

5. The air cleaning system of claim 4, wherein the particle feeder comprises at least one selected from the group consisting of:
   (i) means for monitoring the presence of a supply of particles;
   (ii) means for monitoring the operation of the particle feeder; and
   (iii) means for preventing disruption of the feeding of particles into the air cleaning system.

6. The air cleaning system of claim 1, wherein the housing comprises a cylindrical air inlet which forms the gas inlet opening and which is attached to said first housing portion on a side opposite to the second housing portion, said housing further comprising a bracket which is located inside said cylindrical air inlet and which supports said core.

7. The air cleaning system of claim 1, wherein the first housing portion is attached to the second housing portion by means of a quick release attachment mechanism.

8. The air cleaning system of claim 1, wherein a conduit is attached to the second housing portion at the opening, and pre-separated particles are removed from the particle pre-separator via said conduit.

9. The air cleaning system of claim 8, having a collecting bin releasably attached to the conduit, so that pre-separated particles are collected in the collecting bin.

10. The air cleaning system of claim 9, wherein the collecting bin is attached to the conduit by means of a quick release attachment mechanism, said air cleaning system further comprising a valve unit arranged in said conduit between the opening and said collecting bin.

11. The air cleaning system of claim 1, in combination with a gas treatment system.

12. The combination of claim 11, further comprising a filter assembly downstream from the particle pre-separator, and a particle feeder located between the particle pre-separator and the filter assembly.

13. The combination of claim 12, wherein a gas flowing through the gas treatment system comprises oil, and the particle feeder injects oil absorbing particles into the gas treatment system.

14. The combination of claim 13, wherein the oil absorbing particles comprise lime.

15. The air cleaning system of claim 1, wherein said core is a removable core that is connected to the housing by means of a quick release connection.

16. The air cleaning system of claim 1, wherein the vanes of said core at least partially abut the first housing portion.

17. The air cleaning system of claim 1, wherein said spark arrestor is provided with a hinged or rotatable service hatch to provide easy access to exposed surfaces of the core.

18. The air cleaning system of claim 17, wherein the core is rotatable around its longitudinal axis so that all vanes can be accessed from one single service hatch.

19. The air cleaning system of claim 1, wherein said plane through the first end of the core and said plane through the second end of the core are normal to a longitudinal axis of said core, and wherein the core and vanes are shaped and dimensioned so that particles entering the particle pre-separator of the spark arrestor at said gas inlet never have a straight line of flight to said gas outlet.

20. The air cleaning system of claim 3, wherein
   (i) said means for minimizing contaminant build-up comprising at least one selected from the group consisting of:
      a grease-cutting detergent-water spray unit that sprays water onto exposed spark arrestor surfaces, and
      a dirt repellent coating on the exposed surfaces of the spark arrestor;
   (ii) said means for monitoring the overall operation of the spark arrestor comprising a spark sensor placed immediately downstream of the spark arrestor and connected to circuitry for triggering an optical signal or audible alarm, wherein the spark sensor is wired so as to cause a controller to switch off an exhaust fan of the gas treatment system;
   (iii) said means for monitoring contaminant build-up comprising at least one selected from the group consisting of:
      one or more inspection windows within the spark arrestor that allow visual inspection of an exposed surface of the spark arrestor, with a light source mounted inside the spark arrestor to aid the visual inspection, one or more light sources embedded in an exposed surface of the spark arrestor and one or more sensors placed inside the spark arrestor to receive light emitted by said one or more light sources, wherein an decreasing amount of light received by the one or more light sensors is indicative of fouling build-up on the one or more light sources, a dip stick placed in an area of the spark arrestor receiving representative amounts of contaminants, wherein a visual change in color of the dip stick visually is indicative of fouling build-up on the dip stick, two electrodes arranged in close proximity of each other on an exposed surface of the spark arrestor, wherein an increase in conductivity to an conductivity above that of air is indicative of fouling build-up on the exposed surface, and a vibrating fork level switch or a piezo switch adapted for sensing damping or frequency drift of vibration resulting from surface fouling;

and (iv) said means for facilitating cleaning comprising at least one of the group consisting of:

a non-stick coating on an exposed surface of the spark arrestor, an access service hatch provided on the spark arrestor, with the core being rotatable so that all vanes can be accessed from the access service hatch, and a dust collector with a level detector adapted for providing a warning signal if the dust collector needs to be emptied or replaced.

* * * * *